(12) United States Patent
Takayanagi et al.

(10) Patent No.: US 8,970,234 B2
(45) Date of Patent: Mar. 3, 2015

(54) THRESHOLD-BASED TEMPERATURE-DEPENDENT POWER/THERMAL MANAGEMENT WITH TEMPERATURE SENSOR CALIBRATION

(75) Inventors: Toshinari Takayanagi, San Jose, CA (US); Jung Wook Cho, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 13/245,229

(22) Filed: Sep. 26, 2011

(65) Prior Publication Data

US 2013/0076381 A1 Mar. 28, 2013

(51) Int. Cl.
G01R 31/00 (2006.01)
G01K 15/00 (2006.01)
G01K 3/00 (2006.01)
G06F 1/20 (2006.01)
G06F 1/32 (2006.01)

(52) U.S. Cl.
CPC .............. G01K 15/005 (2013.01); G01K 3/005 (2013.01); G06F 1/206 (2013.01); G06F 1/3296 (2013.01)
USPC .................................................. 324/750.03

(58) Field of Classification Search
USPC ................. 324/754.01–754.3, 762.01–762.1, 324/750.01–750.3
See application file for complete search history.

(56) References Cited

U.S. PATENT DOCUMENTS

| 4,651,292 | A | | 3/1987 | Jeenicke et al. |
|---|---|---|---|---|
| 5,473,259 | A | * | 12/1995 | Takeda ..................... 324/750.03 |
| 5,498,971 | A | * | 3/1996 | Turnbull et al. .............. 374/178 |
| 6,647,320 | B1 | | 11/2003 | Inoue |
| 7,590,473 | B2 | * | 9/2009 | Wyatt ........................... 700/299 |
| 7,734,440 | B2 | | 6/2010 | Hattis |
| 7,739,531 | B1 | | 6/2010 | Krishnan |
| 7,841,771 | B2 | | 11/2010 | Perotti et al. |
| 7,915,910 | B2 | | 3/2011 | von Kaenel |
| 2004/0052290 | A1 | | 3/2004 | Schneider et al. |
| 2004/0264093 | A1 | | 12/2004 | Boerstler et al. |
| 2005/0004717 | A1 | | 1/2005 | Fukushima et al. |
| 2005/0188230 | A1 | | 8/2005 | Bilak |
| 2006/0238267 | A1 | | 10/2006 | Bienek et al. |
| 2007/0014329 | A1 | | 1/2007 | Sinha et al. |
| 2008/0186002 | A1 | | 8/2008 | Singh |
| 2009/0322409 | A1 | | 12/2009 | Levit et al. |
| 2010/0213919 | A1 | | 8/2010 | Takayanagi |
| 2010/0216407 | A1 | | 8/2010 | Gormley |
| 2011/0019713 | A1 | | 1/2011 | Sinha et al. |

OTHER PUBLICATIONS

International Preliminary Report on Patentability from PCT/US2012/056262, mailed Apr. 10, 2014, pp. 1-11.

(Continued)

*Primary Examiner* — Tung X Nguyen
(74) *Attorney, Agent, or Firm* — Meyertons, Hood, Kivlin, Kowert & Goetzel, P.C.; Erik A. Heter

(57) ABSTRACT

A method and apparatus for temperature sensor calibration is disclosed. In one embodiment, an integrated circuit (IC) is tested at a first known temperature corresponding to a first temperature threshold. During the test, a first temperature reading is obtained from a temperature sensor. A first offset is calculated by determining the difference between the first known temperature and the first temperature reading. The first offset is recorded in a storage unit for later use during operation of the IC. During operation, the first offset may be added to temperature readings obtained from a temperature sensing unit to produce an adjusted temperature value. The adjusted temperature value may be compared to one or more temperature thresholds. Based on the comparisons, a power management unit may perform power control actions.

8 Claims, 9 Drawing Sheets

(56) References Cited

OTHER PUBLICATIONS

International Search Report and Written Opinion in application No. PCT/US2012/056262 mailed Dec. 10, 2012.

Extended European Search Report in Application No. 12185167.9, dated Dec. 13, 2013, pp. 1-7.

Office Action from Taiwanese Patent Application No. 101135372, issued May 21, 2014, English and Chinese versions, pp. 1-11.

* cited by examiner

THRESHOLD-BASED TEMPERATURE-DEPENDENT POWER/THERMAL MANAGEMENT WITH TEMPERATURE SENSOR CALIBRATION

BACKGROUND

1. Field of the Invention

This invention relates to temperature sensing in integrated circuits, and more particularly, to the calibration of temperature sensors.

2. Description of the Related Art

As the number of transistors implemented integrated circuits (ICs) has increased, the management of issues related to temperature has increased in importance. In many ICs, a large number of transistors operating at the same time can produce a significant amount of heat. Furthermore, operating temperatures of an IC may be related to other parameters including supply voltages and clock frequencies. Thus, to ensure proper operation of an IC without damage, it is often times necessary to balance an operating temperature with a supply voltage and/or a clock frequency.

Temperature sensors are implemented on many different types of ICs. One or more temperature sensors may be place on an IC die and may be used to determine a temperature at a respective location thereon. The temperature sensors may measure and report temperature information to a power management unit. The power management unit may use the temperature information along with other information (e.g., processing workload) to determine an appropriate operating point (e.g., a clock frequency and operating voltage) of at least a functional unit of the IC, if not the entire IC itself. In setting the operating point, the power management unit may also ensure that the IC remains within designated thermal limits in order to ensure that heat-related damage is not incurred.

SUMMARY

A method and apparatus for temperature sensor calibration is disclosed. In one embodiment, an integrated circuit (IC) is tested at a first known temperature. During the test, a first temperature reading is obtained from a temperature sensor. A first offset is calculated by determining the difference between the first known temperature and the first temperature reading. The first offset may be stored in a storage unit for later use during operation of the IC. The known temperature and the offset values may be represented in any suitable way, e.g., as an actual temperature value, in a digital coding, etc. Furthermore, storing of the temperature values may be accomplished in different ways that may provide the equivalent information.

In one embodiment, the test is continued at a second known temperature. During the test at the second known temperature, a second temperature reading is obtained. A second offset is obtained by determining a difference between the second known temperature and the second temperature reading. The first and second offsets are recorded in a storage unit for later use during operation of the IC.

In one embodiment, the IC may, during operation, receive a temperature reading from a temperature sensor during operation. The temperature reading and the first offset may be added together to determine an approximate first temperature value. The first temperature value may be compared to a first temperature threshold. It is ideal that the first known temperature (during testing) is identical to the first threshold temperature or relatively close thereto. Depending on whether or not the first temperature value exceeds the first temperature threshold, a first power control action may be performed. For example, a power management unit may request reduction of a supply voltage received from an external source responsive to determining that the first temperature value exceeds the first temperature threshold. In an embodiment in which a single point calibration is used, the first temperature value may be compared to a second temperature threshold. If the first temperature value exceeds the second temperature threshold, the power management unit may perform a second power control action, such as shutting down the IC. In embodiments utilizing a two-point calibration, the temperature reading may be added with a second offset to determine an approximate second temperature value. The second temperature value may be compared to the second temperature threshold. If the second temperature value exceeds the second temperature threshold, the power management unit may initiate another power control action. For example, if the second temperature value exceeds the second temperature threshold, the power management unit may initiate an emergency shutdown of the IC. Ideally, the second known temperature may be set to the second temperature threshold or close thereto during testing. In general, the methodology described herein may be performed for any number of offsets and any number of thresholds. Any desired number of calibrations may be performed to produce the corresponding offsets.

BRIEF DESCRIPTION OF THE DRAWINGS

The following detailed description makes reference to the accompanying drawings, which are now briefly described.

Figure 1:
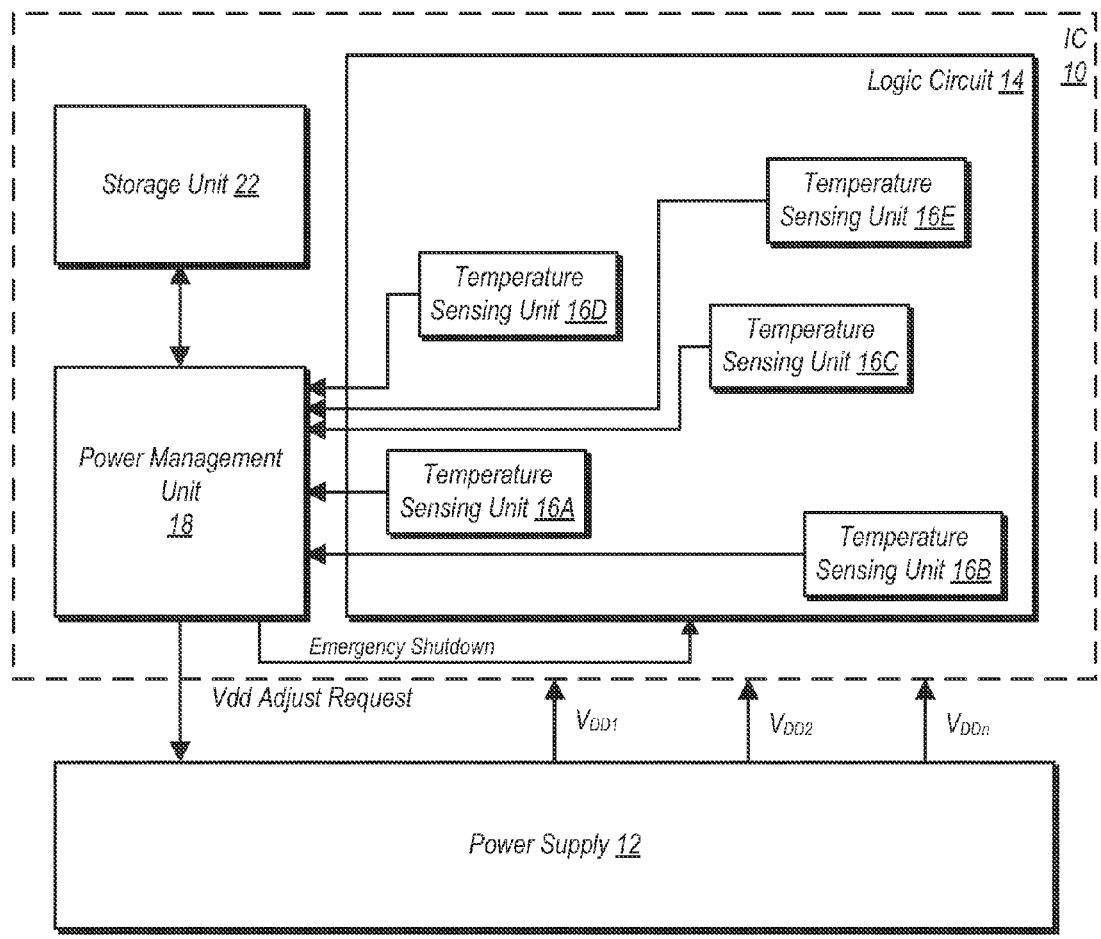
FIG. 1 is a block diagram of one embodiment of a system including an integrated circuit (IC) and a power management unit/power supply.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit with External Power Supply:

Turning now to FIG. 1, a block diagram of one embodiment of an integrated circuit (IC) 10 coupled to an external power supply 12 is shown. In the illustrated embodiment, the integrated circuit 10 includes a logic circuit 14, a plurality of temperature sensing units 16A-16E, a power management unit 18, and a storage unit 22. The temperature sensing units 16A-16E and the storage unit 22 are coupled to the power management unit 18, which is coupled to transmit an indication of a requested supply voltage magnitude (Vdd request) to the power supply 12. The power supply 12 is coupled to provide a supply voltage (Vdd) of the requested magnitude to the integrated circuit 10. The components illustrated within the integrated circuit 10 are integrated onto a single semiconductor substrate, or chip.

The temperature sensing units 16A-16E may be physically distributed over the area of the integrated circuit 10 that is occupied by the logic circuit 14. Each temperature sensing unit 16A-16E may be configured to sense the temperature in the area near that temperature sensor, and to provide an output that indicates the sensed temperature to the power management unit 18. Accordingly, variations in the operating temperature that may occur over the surface area of the integrated circuit chip may be represented in the temperatures reported to the power management unit 18. The power management unit 18 may be configured to periodically compare temperature readings received from the various temperature sensing units 16A-16E to threshold temperatures, and may take power control actions based on the comparisons. The temperature readings received from each of the temperature sensing units 16A-16E may be combined with one or more offsets to determine a more accurate approximation of the actual temperature upon which the temperature reading is based. The offsets may be determined by a calibration procedure to be discussed further below. Also to be discussed in further detail below will be the manner in which the temperature readings are combined with respective offsets and in which comparisons are made to determine the relationship to various temperature thresholds.

The temperature sensing units 16A-16E may each comprise circuitry designed to react to changes in temperature, so that an output representing the temperature can be generated. The temperature sensing units may attempt to measure only the temperature. That is, the temperature sensing units may not be configured to respond (as much as possible) to aging effects, current supply voltage magnitude, etc. In an exemplary embodiment to be discussed below, a temperature sensing unit may include a thermocouple and an analog-to-digital converter to convert an analog temperature reading to a digital value. However, it is noted that many different types of temperature sensing units are possible and contemplated for use with the various method and apparatus embodiments to be discussed herein.

The temperature sensing units 16A-16E may indicate the temperature in any desired fashion. For example, in one embodiment, each temperature sensor may output a numerical value, in a digital format, that indicates the sensed temperature. The temperature sensing units may have varying degrees of accuracy, depending on their implementation. In some cases, accuracy may be improved via calibration during manufacture and/or testing of the integrated circuit 10. During the calibration, offsets may be determined which can be used for adjusting received temperature readings to more closely approximate the actual temperature sensed.

The storage unit 22 may comprise a plurality of entries, each corresponding to an offset for a given one of temperature sensing units 16A-16E. Two or more offsets may be stored for each one of temperature sensing units 16A-16E, and each of these may be combined with a given temperature reading in order to determine whether any temperature thresholds have been exceeded. Storage unit 22 may also store additional information, such as information indicating a slope of a temperature response for each of the temperature sensors, as well as information indicating the various temperature thresholds. Storage unit 22 may be a static table written during manufacturing test of the integrated circuit 10 (e.g. prior to packaging the integrated circuit, such as at wafer test). In other embodiments, the test may be performed at any point prior to selling the integrated circuit 10 for inclusion in a device, or prior to including the integrated circuit 10 in such a device. In one embodiment, storage unit 22 may be implemented using fuses, some of which are blown during a calibration procedure performed prior to sale of integrated circuit 10.

The power management unit 18 comprises circuitry that is configured to request a supply voltage magnitude to the external power supply (e.g. power supply 12). The requested supply voltage magnitude may be modified to compensate for the operating temperature of the integrated circuit 10 as sensed by the temperature sensing units 16A-16E. The power management unit 18 is configured to transmit the request to the power supply 12 (Vdd request in FIG. 1). The request may be represented in any desired fashion. For example, the request may comprise a plurality of bits, with various supply voltage magnitudes within a range of supported magnitudes each assigned a different encoding of the plurality of bits.

Power management unit 18 may also initiate an emergency shutdown of integrated circuit 10 should a temperature value exceed a certain threshold value. When initiating an emergency shutdown, power management unit 18 may assert a signal indicating the same ('Emergency Shutdown') that is provided to logic circuit 14. Logic circuit 14 may begin performing any necessary operations to be performed in conjunction with an emergency shutdown. In addition, power management unit 18 may also send a request to power supply 12 to discontinue providing a supply voltage to integrated circuit 10 responsive to initiating an emergency shutdown.

The logic circuit 14 may generally include the circuitry that implements the operation for which the integrated circuit 10 is designed. For example, if the design includes one or more processors, the logic circuit 14 may include the circuitry that implements the processor operation (e.g. instruction fetch, decode, execution, and result write). If the design includes a bridge to a peripheral interface, the logic circuit 14 may include the circuitry that implements the bridge operation. If the design includes other communication features such as packet interfaces, network interfaces, etc., the logic circuit 14 may include circuitry implementing the corresponding features. The integrated circuit 10 may generally be designed to provide any set of operations. Generally, the logic circuit 14 may comprise any combination of one or more of the following: memory arrays, combinatorial logic, state machines, flops, registers, other clocked storage devices, custom logic circuits, etc.

The power supply 12 may generally include any circuitry that is capable of generating a supply voltage of a magnitude indicated by an input voltage request. The circuitry may include one or more voltage regulators or other power sources, for example.

While the above discussion has referred to requesting a supply voltage magnitude, and the power supply 12 supplying a voltage of the requested magnitude, the discussion is not meant to imply that there is only one requested/supplied voltage. There may be multiple supply voltages requested and supplied at any given point in time. For example, there may be separate supply voltages for combinatorial logic circuitry and for memory circuitry in the logic circuit 14. There may be multiple voltage domains within the integrated circuit 10 that may be powered up and down separately, and each domain may include a separate request. The power management unit 18 may be powered separate from the logic circuit 14. Any set of one or more supply voltages may be requested and supplied.

The magnitude of the supply voltage has been referred to above as being requested, and the supply voltage of the requested magnitude being supplied. The magnitude of the supply voltage may be measured with respect to a reference (e.g. the ground of the integrated circuit 10, sometimes referred to as $V_{SS}$). For convenience in the description below, voltages may be referred to as being greater than or less than other voltages. Similarly, measurement of a voltage may be referred to herein. In such cases, it is the magnitude of the voltage that is greater than (or less than) the other voltage, or that is measured.

It is noted that, while five temperature sensing units 16A-16E are shown in FIG. 1, any number of temperature sensing units may be implemented, as desired. It is further noted that the size of the temperature sensing units 16A-16E with respect to the logic circuit 14 is not intended to represent the actual relative size. In many embodiments, the temperature sensing units are significantly smaller with respect to the logic circuit 14. Similarly, other blocks in FIG. 1 and other figures herein are not necessarily intended to represent actual relative size.

Figure 2:
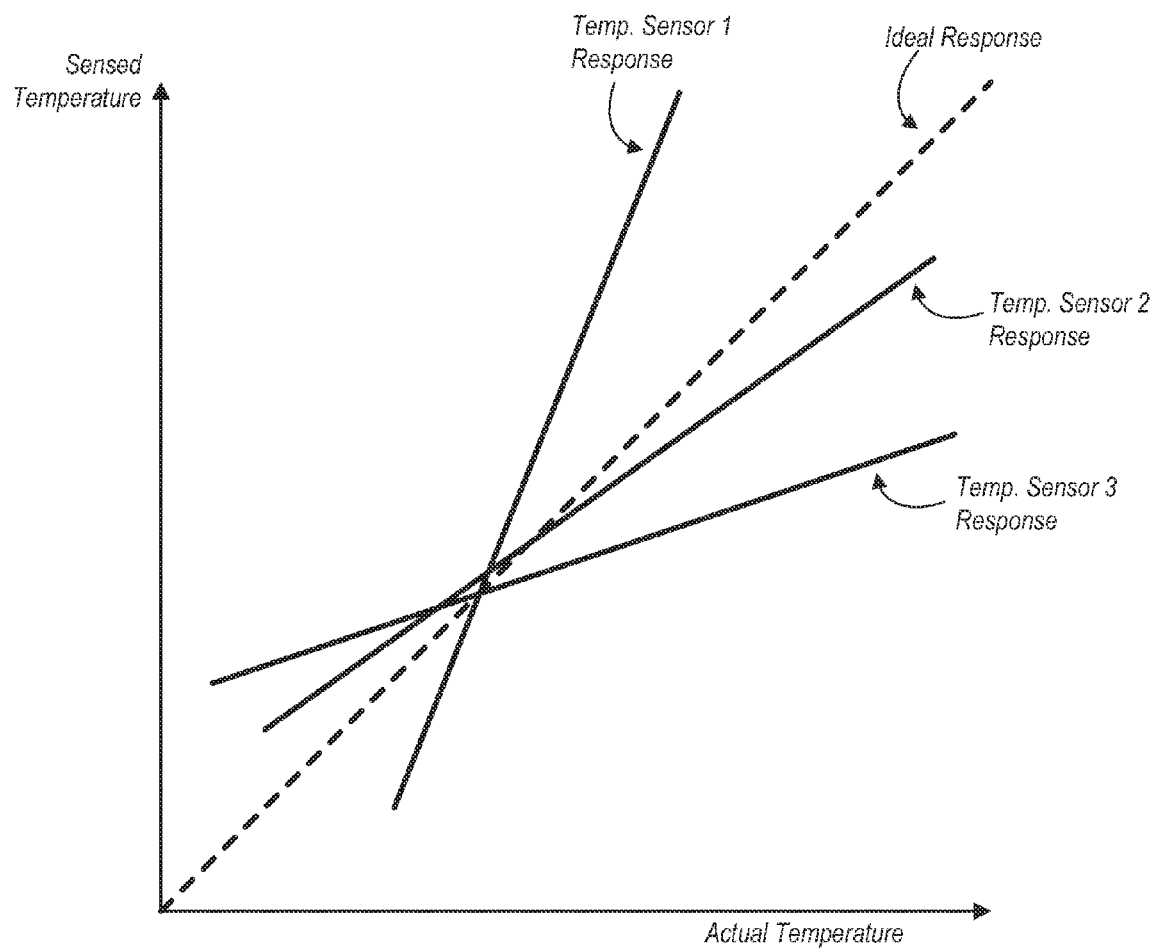
FIG. 2 is a graph illustrating exemplary variations between ideal temperature sensor response and actual temperature sensor response for one embodiment of an IC having temperature sensors.

The response of a temperature sensor in a given one of temperature sensing units 16A-16E may vary from one instance to the next on a given instance of integrated circuit 10. Furthermore, the response may vary from one instance of integrated circuit 10 to the next. FIG. 2 illustrates various response curves for different instances of a temperature sensor. The illustration may apply to temperature sensors implemented on the same IC die or temperature sensors implemented on different IC dies.

FIG. 2 is a graph illustrating exemplary responses of different instances of a temperature sensor that is implemented on an IC. The ideal response, shown with the dashed line, occurs where the sensed temperature matches the actual temperature of the area of the IC surrounding the temperature sensor across a large range of actual temperatures. In practice, process and other variations may cause the response of a given temperature sensor to be different than the ideal. In FIG. 2, respective responses of three different exemplary temperature sensors are shown. For each of the temperature sensors, the slope of the response is different from the ideal. Left uncalibrated, the temperature sensors would provide inaccurate temperature readings that in turn could make more difficult thermal control of the IC in which they are implemented. Accordingly, a calibration routine may be performed during manufacturing test or at some point prior to either shipping the IC or placing it into an operational system. The calibration routine may determine offsets for each temperature sensor. The offsets may be defined as the difference between a temperature value sensed by a temperature sensor and the actual temperature of the surrounding area of the IC. Power management unit 18 may include arithmetic circuitry (e.g. adders and/or subtractors) coupled to receive a digital value indicative of the actual temperature at which a test is conducted, as well as a temperature value that was sensed during the test. Using these values, the offset may be determined. The arithmetic circuitry may also be used to combine the offset value with a sensed temperature value to determine an approximation of the actual temperature during normal operation of IC 10. The approximation of the actual temperature may be utilized by power management unit 18 to perform various actions to ensure that the IC remains within thermal limits.

Figure 3:
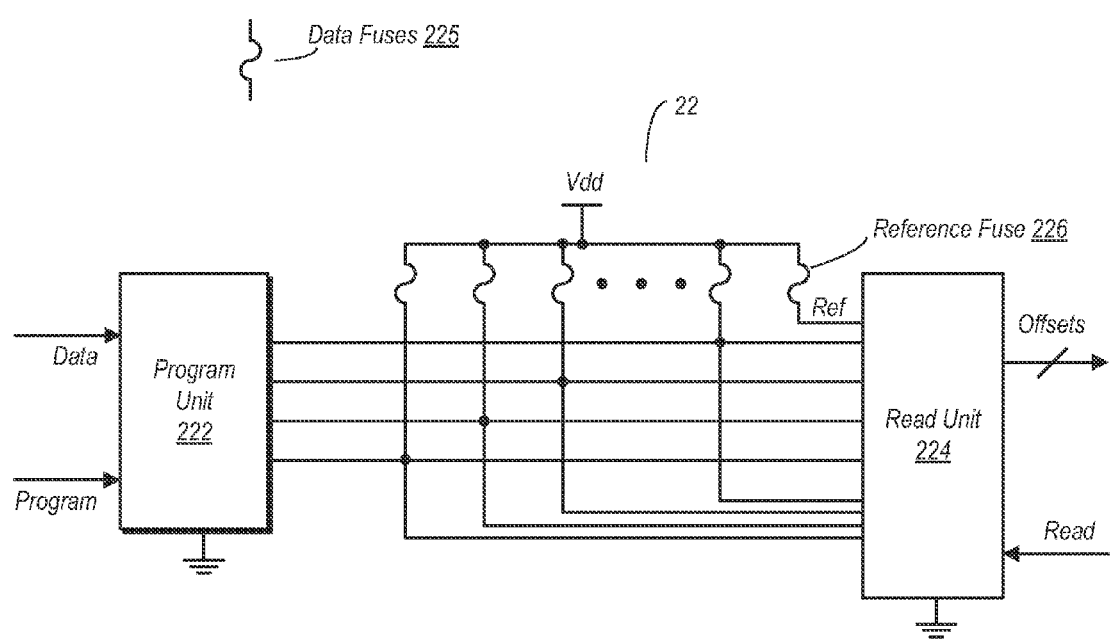
FIG. 3 is an illustration of one embodiment of a storage location of a storage unit implemented using fuses.

FIG. 3 illustrates an exemplary embodiment of a storage unit implemented using fuses. In the embodiment shown, storage unit 22 includes a number of data fuses 225 and a reference fuse 226. Storage unit 22 also includes a program unit 222 for programming the fuses, and a read unit 224 for reading the fuses during operation of the IC in which it is implemented. It is noted that the illustration shown here is simplified, and that a storage unit implementing fuses may include additional circuits for addressing and other concerns.

As defined herein, a fuse may be considered programmed if it has been blown (i.e. severed) by the programming unit 222. If the fuse is not blown, it is not considered to be programmed. For a given group of data fuses 222, a digital data value may be stored therein as a mixture of programmed and non-programmed fuses.

To program the fuses, program unit 222 may, responsive to receiving a programming signal ('Program') and the data to be programmed ('Data'). The programming unit may couple signal lines corresponding to fuses to be programmed to ground. When a given one of these signal lines is grounded, a short circuit between Vdd and ground is momentarily created until the current through the corresponding fuse 222 causes it to blow.

To read a particular fuse, read unit 224 may compare a voltage on its respective signal line to that on the signal line of reference fuse 226. In the embodiment shown, reference fuse 226 is not blown, and has a larger resistance than any of data fuses 225 that are not blown. Accordingly, a voltage comparison can be made between the voltage on a signal line associated with a data fuse 225 and reference fuse 226. If a fuse is not programmed (i.e. not blown), the voltage on the corresponding signal line may be higher than that of the signal line associated with reference fuse 226. If the fuse is programmed (blown), the voltage may be less than that of the signal line associated with reference fuse 226.

Although not explicitly shown here, groups data fuses 225 of storage unit 22 may be divided into various storage locations. At least some of these storage locations may store temperature offsets, and may additionally include information regarding the actual temperature of the IC at which the offsets were computed. In some embodiments, additional information may be stored in storage unit 22. Such information may include information regarding temperature thresholds, information regarding the slope of a response curve for particular temperature sensors (e.g., similar to the information shown in FIG. 2), and so forth.

Figure 4:
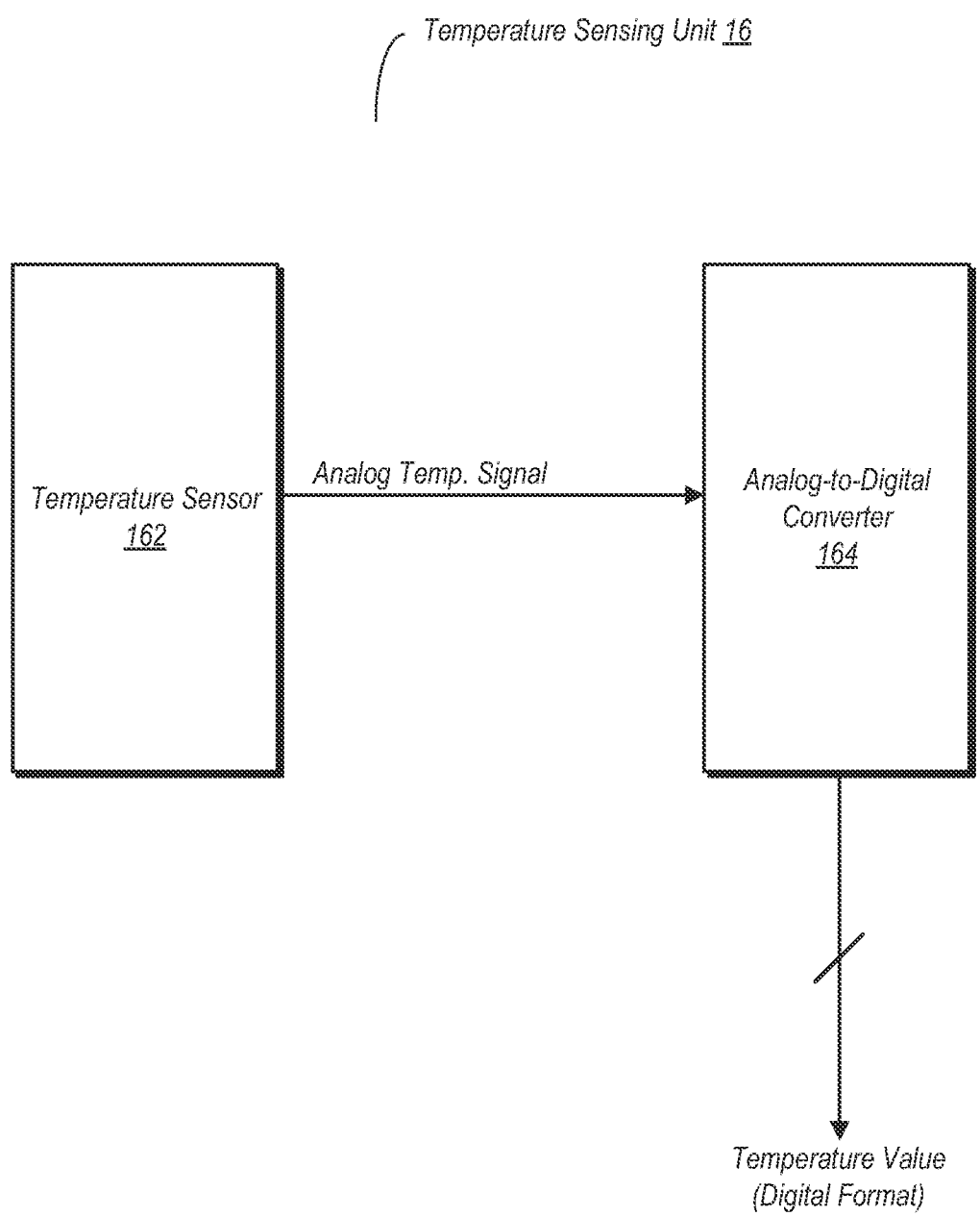
FIG. 4 is a block diagram illustrating one embodiment of a temperature sensing unit.

Temperature Sensing Unit and Temperature Comparison Apparatus:

Turning now to FIG. 4, one embodiment of a simplified version of a temperature sensing unit 16 is shown. In the illustrated example, temperature sensing unit 16 includes a temperature sensor 162 and an analog-to-digital converter (ADC) 164. In one embodiment, temperature sensor 162 may be implemented as a thermocouple. A thermocouple may be implemented by creating a junction of two dissimilar metals on the IC die. The thermocouple may output an analog signal having a voltage that corresponds to its detected temperature. The analog temperature signal may be converted into a digital value by ADC 164, which may then be provided to power management unit 18.

It is noted that the temperature sensing unit 16 discussed herein is only one possible embodiment. Other temperature sensing units utilizing different types of temperature sensors are possible and contemplated. For example, embodiments utilizing temperatures sensors based on ring oscillators with temperature-dependent delay characteristics are also possible and contemplated.

Figure 5A:
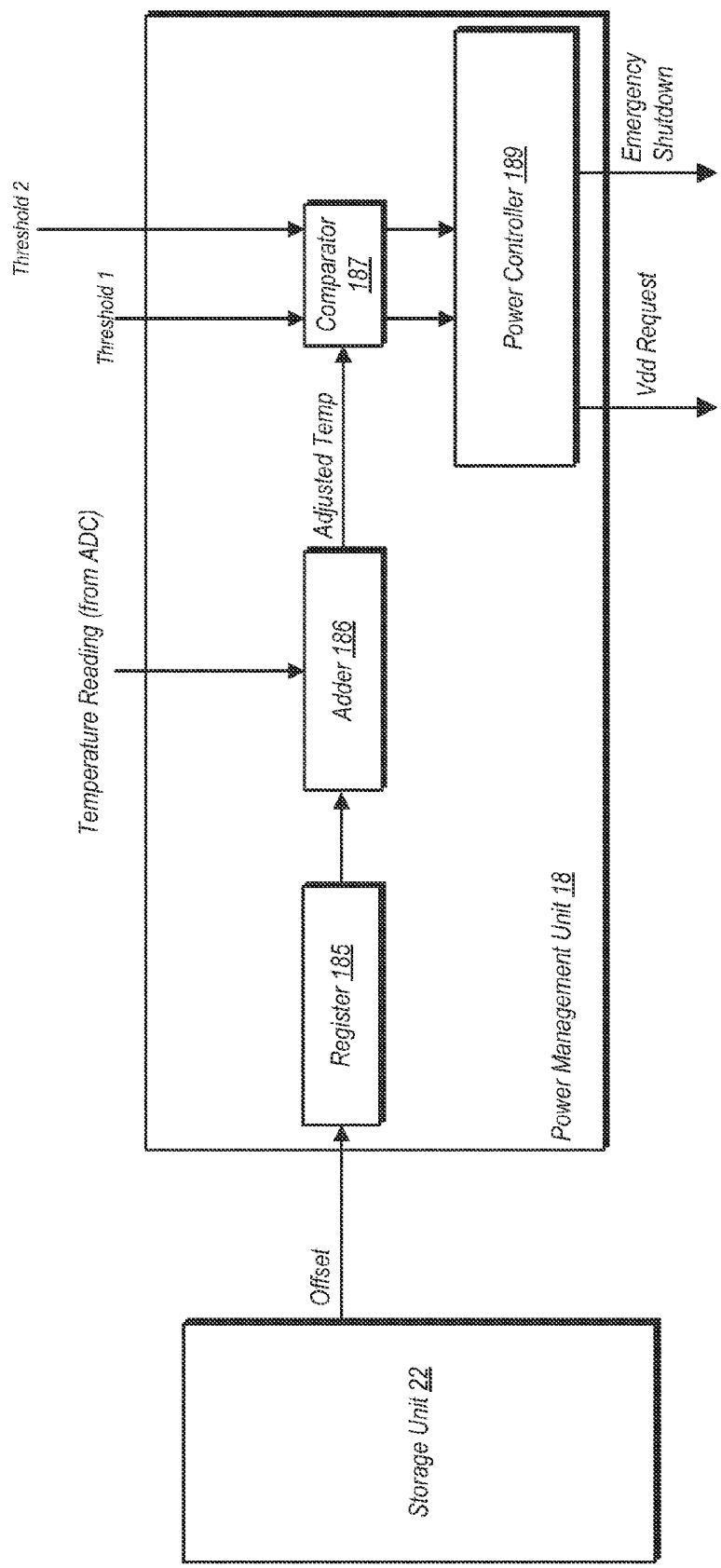
FIGS. 5A and 5B are a block diagrams illustrating two different embodiments of a temperature comparison apparatus of a power management unit.
Figure 5B:
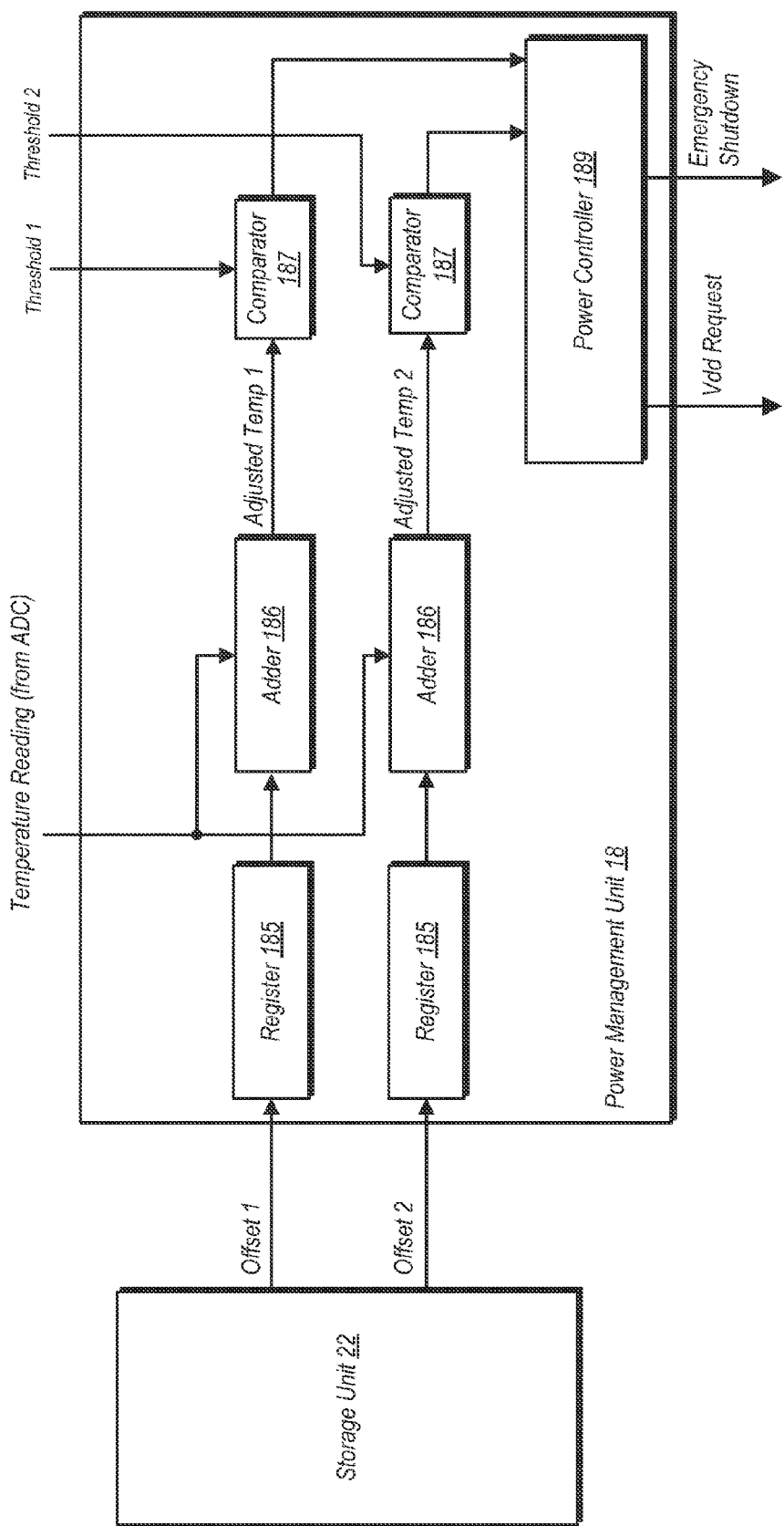

FIGS. 5A and 5B are block diagrams illustrating various embodiments of a temperature comparison apparatus of a power management unit. The comparison apparatus of power management unit 18 shown in FIGS. 5A and 5B may compare adjusted temperature readings to certain temperature thresholds to determine whether certain power management actions should be taken to maintain IC operation within specified thermal limits. It is noted that while the embodiments shown here are arranged to compare adjusted temperatures to two different thresholds, embodiments are possible and contemplated wherein comparisons to one or more than two thresholds are performed. Furthermore, while the embodiments shown in FIGS. 5A and 5B may perform two separate comparison operations in parallel, embodiments in which multiple temperature comparisons are performed sequentially are also possible and contemplated. For example, an embodiment is contemplated wherein a single comparison apparatus would compare a adjusted temperature to a highest temperature threshold first, a next adjusted temperature to a next lowest temperature threshold, and so on.

In the embodiment of FIG. 5A, register 185 is coupled to receive an offset value (which may be positive or negative) from storage unit 22. The offset value stored in register 185 may be conveyed to adder 186, which is also coupled to receive a temperature reading from ADC 164 of temperature sensing unit 16. The temperature reading and the offset value may be added together to obtain an adjusted temperature value. The adjusted temperature value may then be provided to comparator 187. In addition to receiving the adjusted temperature value, comparator 187 may also receive first and second threshold values ('Threshold 1' and 'Threshold 2', respectively). Comparator 187 may compare the adjusted temperature threshold values to determine if either of the thresholds is exceeded.

In this particular embodiment, a first temperature threshold may be less than that of a second temperature threshold. If the adjusted temperature ('Adjusted Temp') exceeds the first threshold, power controller 189 may send a request to an external power supply (e.g., via the 'Vdd Adjust Request' signal path) to reduce the supply voltage. In some cases, if the first adjusted temperature is less than the first temperature threshold, power controller 189 may take no action, or may request an increased supply voltage if necessary to keep up with a processing workload.

The second temperature threshold in this example may represent a maximum allowed operating temperature for the IC beyond which damage is possible. Accordingly, if the adjusted temperature exceeds the second temperature threshold, power controller 189 may initiate an emergency shutdown of the IC. The emergency shutdown may include a ceasing of all processing operations and may also include power controller 189 sending a request to the external power supply to reduce the supply voltage to zero, thereby removing power from the IC.

In the embodiment shown in FIG. 5B, power management unit 18 includes a pair of registers 185 that are coupled to receive first and second offset values from storage unit 22. The first and second offset values in this example correspond to differences between sensed and actual temperatures of first and second tests, respectively. Registers 185 may each forward the received offset value to a correspondingly coupled adder 186. Each adder 186 is also coupled to receive a temperature reading value from ADC 164 of a temperature sensing unit 16. Each adder may add the respectively received offset value (which may be positive or negative) to the received temperature reading value to obtain an adjusted temperature value. The adjusted temperature values, based on separate calibrations, may represent a more accurate indication of the actual temperature that was sensed by the temperature sensor 162 of the reporting temperature sensing unit 16.

Each of the adjusted temperature values may be provided to a corresponding comparator 187. A first comparator 187 may receive a first temperature threshold (Threshold 1') while a second comparator 187 may receive a second temperature threshold (Threshold 2'). In one embodiment, the threshold values may be received from storage unit 22 or another storage device. In another embodiment, the comparators 187 may include registers, fuses, or other storage means for storing temperature thresholds therein. Each comparator 187 may compare its respectively received adjusted temperature value to its respectively received threshold value. The results of the comparisons may then be forwarded to power controller 189, which may in some cases perform power control operations based on the comparison information.

In general, while the embodiment of FIG. 5B is arranged for a two point calibration, embodiments are possible and contemplated in which the calibration described above may be performed for any number of points (including a single point calibration method for the embodiment of FIG. 5A).

It is noted that while the power control actions discussed here are primarily related to increasing or reducing a supply voltage (or removing it altogether during an emergency shutdown), other actions are possible and contemplated. For example, power controller 189 in some cases could also request a change of a clock signal frequency based on the result of a comparison operation. In another example based on a multiple core processor, a processing workload could be re-allocated from one processing core exceeding a temperature threshold to another one that is operating below the same threshold. Power-gating of functional units that exceed temperature threshold or are idle may also be performed by power controller 189 or other portions of power management unit 18. In general, power management unit 18 may utilize the temperature comparison information in any manner useful to maintain safe operation of the IC while enabling optimum performance.

Figure 6:
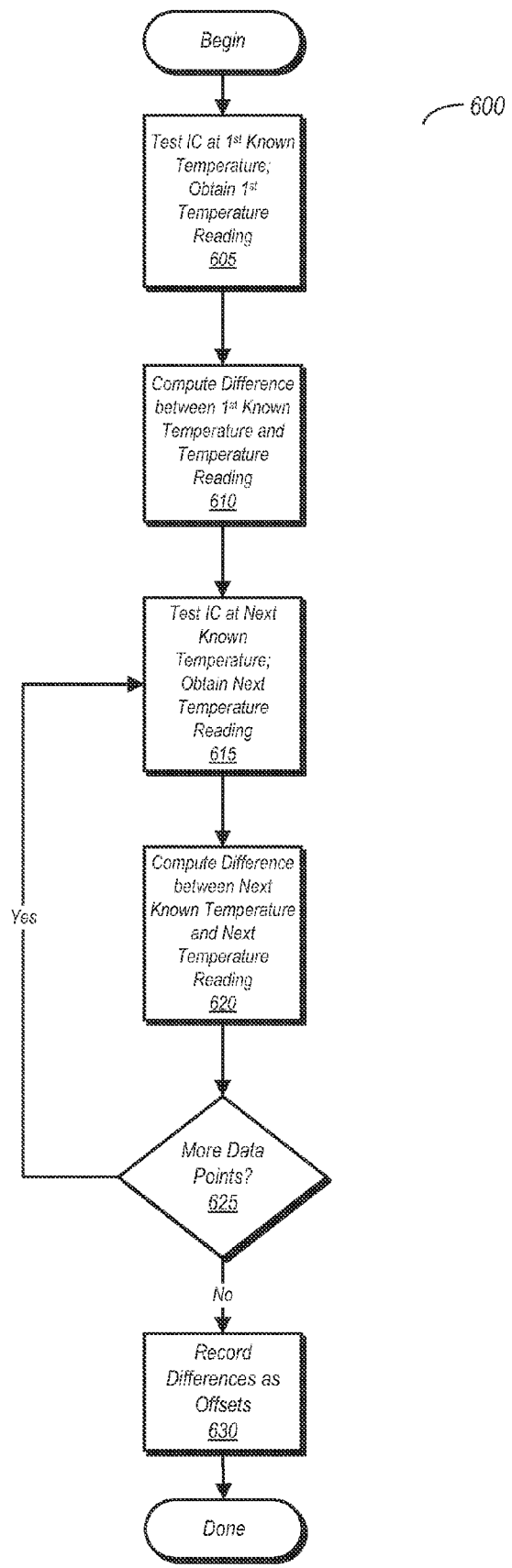
FIG. 6 is a flow diagram illustrating one embodiment of a temperature sensor calibration method.

Calibration and Operation Method Flow Diagrams:

Turning now to FIG. 6, a flow diagram of one embodiment of a temperature sensor calibration method is shown. It is noted that the method illustrated by FIG. 6 is based on calibration at multiple points. However, the method may be altered for calibrations at a single point or for calibrations at any number of points greater than two. In embodiments in which calibration is performed for only a single point, the IC tests at additional temperatures and corresponding computing of differences (block 615 and 620) may be eliminated.

Method 600 begins with the testing of an IC at a known temperature and obtaining a $1^{st}$ temperature reading (block 605). In the illustrated embodiment, the known temperature may correspond to a threshold temperature. During the test, the IC may be placed in a temperature-controlled environment in which it may be set to the known temperature. The temperature reading obtained from a temperature sensing unit may be compared to the known temperature at which the test is conducted, and a difference between these two values may be computed (block 610) in order to determine a first offset value.

Method 600 further includes conducting a subsequent test at a next known temperature (which may also correspond to a threshold temperature), and obtaining a next temperature reading during this test (block 615). The difference between the next known temperature and the next temperature reading may be computed (block 620) to determine a next offset value. If additional offset values are desired (block 625, yes), then additional tests at additional known temperatures may be conducted (return to block 615), with their respective offsets computed (block 620). Each of the known temperatures may correspond to a temperature threshold. If no additional offsets are desired (block 625, no) the computed offsets may be recorded in a storage unit (block 630). The storage unit may be a fuse unit such as that shown above, or another type of storage unit.

Figure 7:
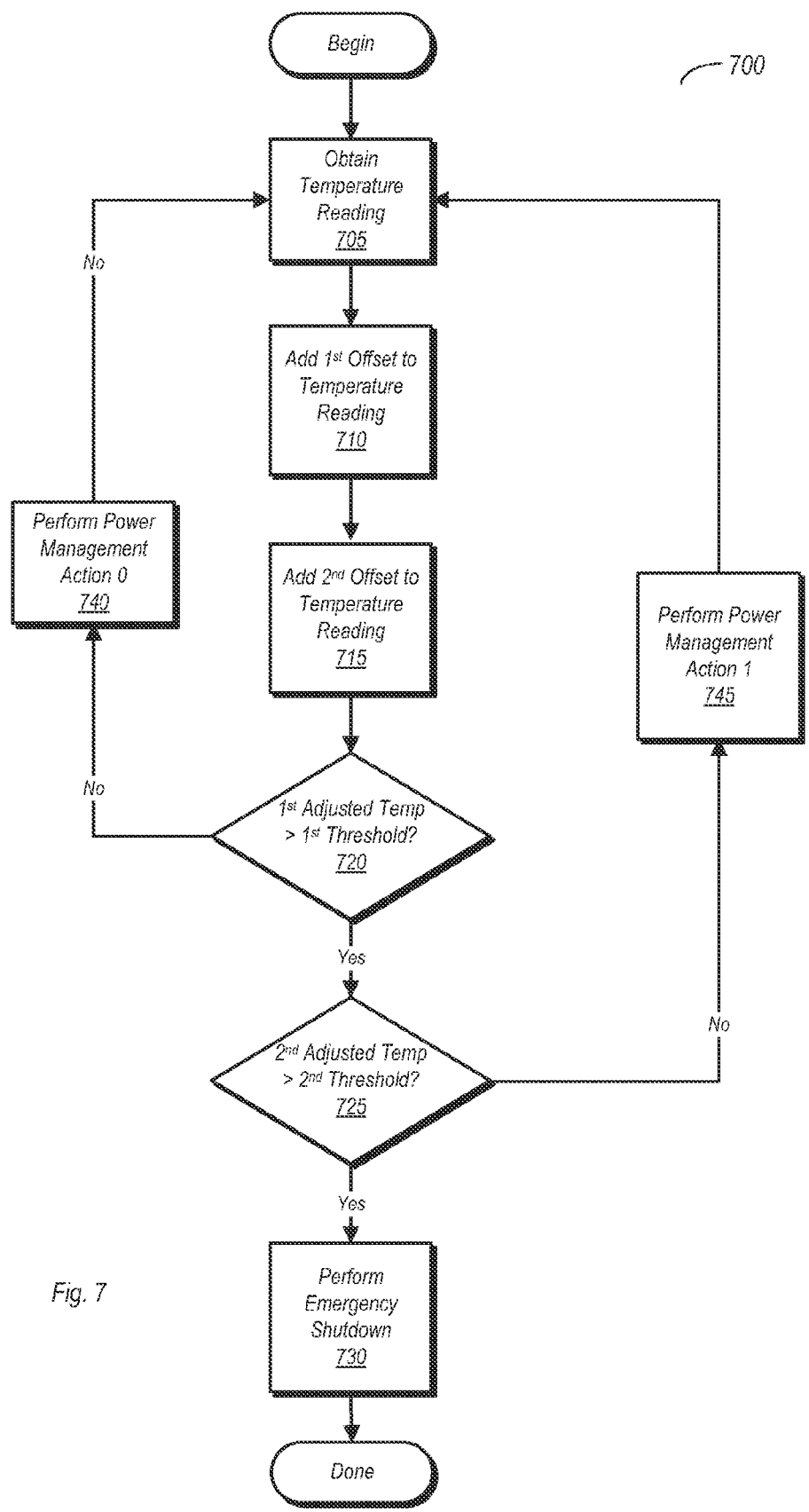
FIG. 7 is a flow diagram illustrating one embodiment of a method for operation of a power management unit in an IC.

FIG. 7 is a flow diagram illustrating the use of the offsets computed in the method of FIG. 6 during operation of an IC. It is noted that the methodology illustrated by FIG. 7 applies to an embodiment in which a two-point calibration has been performed. However, similar embodiments based on a single-point calibration or calibrations at more than two points are possible and contemplated. In an embodiment based on a single-point calibration, block 715 may be eliminated, while the comparison performed in block 725 may be between the first adjusted temperature and the second threshold. For embodiments based on more than two calibration points, additional offsets may be added to the temperature readings, and additional comparison operations may be performed.

In the embodiment shown, method 700 begins with the obtaining of a temperature reading from a temperature sensing unit (block 705). The obtained temperature reading may then be added to a first offset (block 710) and a second offset (block 715) to obtain first and second adjusted temperature values. These adjusted temperature values may then be compared to respective temperature thresholds. In this example, comparisons are made to first and second temperature thresholds, wherein the first temperature threshold is less than the second. The second temperature threshold in this example may represent a specified maximum safe operating temperature of the IC.

If the first adjusted temperature is less than a first temperature threshold value (block 720, no), then the method may perform a first power management action (block 740). The first power management action may include one or more of increasing an operating voltage, increasing a clock frequency, or other type of performance boost. The method may then advance to the next period during which another temperature reading may be obtained (return to block 705). If the first adjusted temperature exceeds the first temperature threshold (block 720, yes) but the second adjusted temperature does not exceed the second temperature threshold (bock 725, no), a power management unit may perform a second power management action (block 745) before returning to block 705 for the next periodic temperature reading. The second power management action may include one or more of reducing an operating voltage, reducing a clock frequency, or other type of action intended to reduce power consumption and/or thermal output. If the second adjusted temperature does exceed the second temperature threshold (block 725, yes), then the power management unit may initiate an emergency shutdown (block 730).

Figure 8:
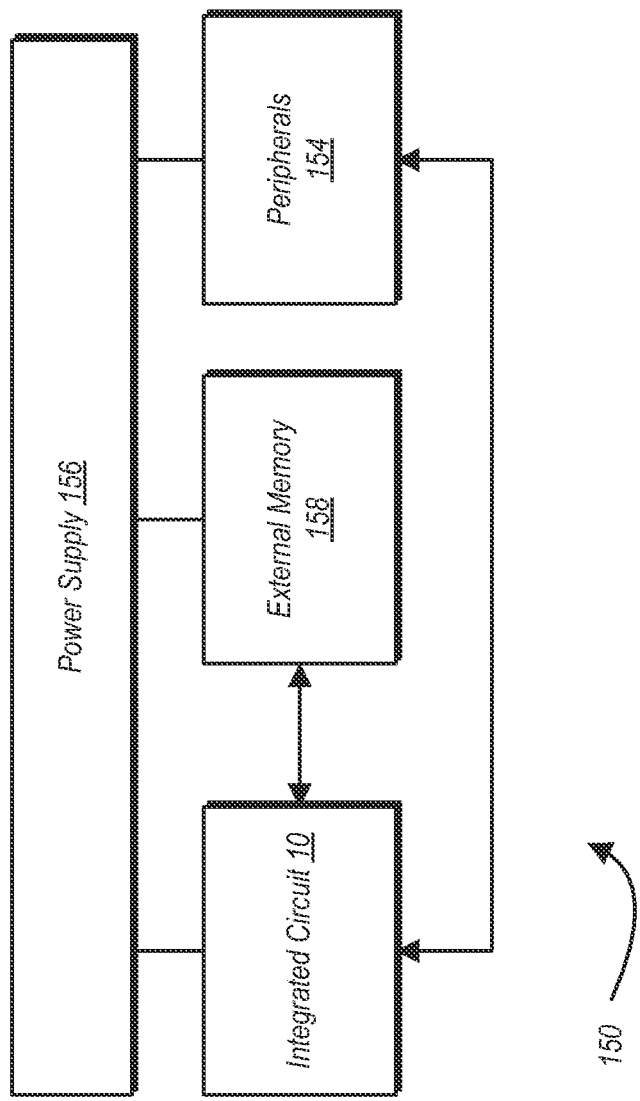
FIG. 8 is a block diagram of one embodiment of a system.

Exemplary System:

Turning next to FIG. 8, a block diagram of one embodiment of a system 150 is shown. In the illustrated embodiment, the system 150 includes at least one instance of an IC 10 (e.g., from FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc. Memory 158 may in some embodiments be the equivalent of memory 5 shown in FIG. 1, and thus may be coupled to IC 10 via a number of interface circuits 100.

Numerous variations and modifications will become apparent to those skilled in the art once the above disclosure is fully appreciated. It is intended that the following claims be interpreted to embrace all such variations and modifications.

What is claimed is:

1. A method comprising:
 performing tests an integrated circuit (IC) at a first specified temperature;
 reading a first temperature value provided by a temperature sensor during testing during testing at the first temperature;
 determining a first offset value, wherein the first offset value is a difference between the first specified temperature and the first temperature value;
 recording the first offset value;
 repeating the testing for one or more additional specified temperatures including a second specified temperature;

reading one or more additional temperature values provided by the temperature sensor, including a second temperature value, during each iteration of said testing;

determining one or more corresponding additional offset values, including a second offset value; and recording each of the one or more corresponding additional offset values.

2. The method as recited in claim 1, further comprising recording the first and second offset values and each of the one or more additional offset values in a fuse unit, wherein recording each of the first and second offset values and the one or more additional offset values by blowing one or more fuses.

3. The method as recited in claim 1, further comprising:

reading an operational temperature value from the temperature sensor;

determining an actual temperature value by adding the operational temperature value to the first offset value; and determining whether the actual temperature value exceeds the first specified temperature, wherein the first specified temperature is a threshold value.

4. The method as recited in claim 3, further comprising:

a power management unit requesting an external power supply to provide a first operating voltage IC if the actual temperature value exceeds the first specified temperature; and the power management unit requesting the external power supply to provide a second operating voltage to the IC if the actual temperature value is less than the first specified temperature.

5. A method comprising:

performing a plurality of tests of an integrated circuit, wherein each of the plurality of tests is performed at one of a plurality of known temperature values;

reading, during each of the plurality of tests, one of a plurality of detected temperature values output by a temperature sensing unit;

determining a plurality of offset values, wherein each of the plurality of offset values corresponds to a calculated difference between one of the known temperature values and a corresponding one of the plurality of detected temperature values;

storing each of the plurality of offset values; and determining an offset variation slope based on the plurality of offset values.

6. The method as recited in claim 5, further comprising:

receiving a temperature reading from the temperature sensing unit during operation of the integrated circuit;

calculating a first operational temperature by adding the temperature reading and a first one of the plurality of offset values;

determining if the first operational temperature exceeds a first temperature threshold; and maintaining a supply voltage at a first voltage value if the first operational temperature is less than the first temperature threshold.

7. The method as recited in claim 6, further comprising a power management unit request a reduction of the supply voltage to a second voltage value if the first operational temperature exceeds the first temperature threshold.

8. The method as recited in claim 6, further comprising:

calculating a second operational temperature, wherein calculating the second operational temperature comprises adding the temperature reading to a second one of the plurality of offset values;

determining if the second operational temperature exceeds a second temperature threshold; and performing a shutdown of the integrated circuit is the second operational temperature exceeds the second threshold.

\* \* \* \* \*